June 3, 1958  M. P. BUCK ET AL  2,837,626
METHOD FOR PRODUCING WELDED TUBING
Filed Feb. 2, 1951  6 Sheets-Sheet 1

FIG. 1

INVENTORS
MORTIMER PIERCE BUCK
AND CECIL FRANKLIN CRUMBLEY
BY
ATTORNEY

INVENTORS
MORTIMER PIERCE BUCK
AND CECIL FRANKLIN CRUMBLEY
BY
*A. A. Deller*
ATTORNEY June 3, 1958   M. P. BUCK ET AL   2,837,626
METHOD FOR PRODUCING WELDED TUBING
Filed Feb. 2, 1951   6 Sheets-Sheet 3

INVENTORS
MORTIMER PIERCE BUCK
AND CECIL FRANKLIN CRUMBLEY
BY
ATTORNEY

United States Patent Office 2,837,626
Patented June 3, 1958

2,837,626

METHOD FOR PRODUCING WELDED TUBING

Mortimer Pierce Buck and Cecil Franklin Crumbley, Huntington, W. Va., assignors to The International Nickel Company, Inc., New York, N. Y., a corporation of Delaware Application February 2, 1951, Serial No. 208,992

18 Claims. (Cl. 219—61)

The present invention relates to an improved method for producing welded tubing and more particularly to a method for producing helically-formed, butt-welded tubes having a helical weld seam which, in the as-welded condition, is substantially flush with the inside surface and/or outside surface of the tube wall. The present invention also relates to a unique machine for producing helically butt-welded tubing and to a novel, helically-formed, butt-welded tube having a helical weld substantially flush in the as-welded condition with at least one surface of the tube wall.

It is well known that helically-formed, welded tubes have heretofore been made by various methods employing various machines long known to the art. One of the earliest known methods involved helically-forming sheet-metal skelp and hot forging, in a single operation, the over-lapping edges of the metal helix. For example, such a procedure is disclosed in U. S. Patent Nos. 393,743 and 414,524. At a much later date, J. D. Beebe in his U. S. Patent No. 1,523,927, disclosed a method for helically-forming tubing from strip and then, by electric-welding technique, continuously butt welding the edges of the strip in a single operation. Further advances to the art of producing helical, welded tubing were made by F. L. Williams (U. S. Patent Nos. 1,583,212; 1,689,374; 1,788,220 and 2,233,233) and by R. Stresau (U. S. Patent Nos. 1,795,380 and 1,832,059). However, all the prior art methods and machines, involving helically-forming either hot or cold metal strip or skelp and then lap, butt or flange welding the edges thereof by various welding techniques, accomplished the weld in a single operation at one stage of the process.

Where butt-welding techniques were employed, a root bead, i. e., a weld metal extrusion beyond the tube wall limits, of necessity was formed if complete weld penetration was to be assured. Where lap welds were employed, crevices between weld metal and parent metal of necessity were formed. Such discontinuities in the smoothness of the tube walls promoted turbulence when fluids, e. g., gases, liquids or pulps, were flowed through or around the tubes and, in the case where the fluids were corrosive in nature, the very serious problem of preferential corrosion at and around the weld arose.

To avoid surface irregularities in such welded tubes, the art resorted to expensive grinding and/or machining operations after welding which, in many cases, were very costly. Another problem also encountered by the art occurred in the manufacture of clad tubing by the foregoing methods wherein the cladding metal in the weld zone was contaminated by the base metal since the single-step welding operation, which produced welds having complete wall-to-wall weld penetration, caused base metal to fuse and consequently to contaminate the cladding metal. Such contamination of the cladding metal by the base metal, incurred by the single, wall-to-wall, welding operation, very greatly depreciated the desired physical, metallurgical and/or chemical characteristics of the cladding metal in the weld zone.

Although attempts were made to overcome the foregoing difficulties and other disadvantages inherent in the prior art methods, none, as far as we are aware, was entirely successful when carried into practice commercially on an industrial scale.

It has now been discovered that helically-formed, butt-welded tubes of a wide variety of compositions, diameters, gauges, and lengths, either homogeneous tubes or clad-metal tubes, can be produced under specially controlled welding conditions wherein the weld seams and the inside surface and/or outside surface of the tube wall form substantially continuous, smooth, flush surfaces in the as-welded condition. In the case of clad tubing, the welding operations of the present process can be controlled to eliminate contamination of the clad metal by the base metal.

It is an object of the present invention to provide a method for producing helically-formed, butt-welded tubing wherein the as-welded seam is substantially flush with the inside and/or outside surface of the tube wall in the as-welded condition.

The invention also contemplates providing a method for producing helically-formed, butt-welded, clad-metal tubing having weld seams substantially flush in the as-welded condition with one or both tubing wall surfaces wherein the clad metal is uncontaminated by the base metal in the weld zone.

It is a further object of the invention to provide a method for butt welding helically-formed tubing wherein the degree of weld penetration is closely controlled to produce welds which form a substantially continuous smooth surface with the parent metal surfaces in the as-welded condition.

The invention further contemplates providing a novel welding technique whereby weld penetration in the manufacture of helically-formed, butt-welded tubes can be closely and accurately controlled.

The invention also contemplates providing a method for producing helically-formed, butt-welded tubing, either from clad or homogeneous metal strip, in which one of the welds (either the inside or the outside weld) is substantially flush with the corresponding surface of the tube in the as-welded condition and the other weld is reinforced by the addition of filler metal.

Still another object of the invention is to provide a novel machine for helically-forming and butt-welding metal strip wherein the weld penetration can be accurately and closely controlled to produce welds which, in the as-welded condition, are substantially flush with the inner and/or outer tube-wall surfaces.

Another object of the invention is to provide helically-formed, butt-welded tubing of a wide variety of compositions, lengths, gauges and diameters and comprising a plurality of continuous convolutions of substantially uniform width and thickness wherein the contiguous abutting edges of adjacent convolutions are permanently and rigidly united by a continuous butt weld which is substantially flush with a surface of the tube wall in the as-welded condition, i. e., wherein one or both wall surfaces are smooth without discontinuities in the as-welded condition.

Other objects and advantages will become apparent from the following description taken in conjunction with the accompanying drawing in which.

Figure 1:
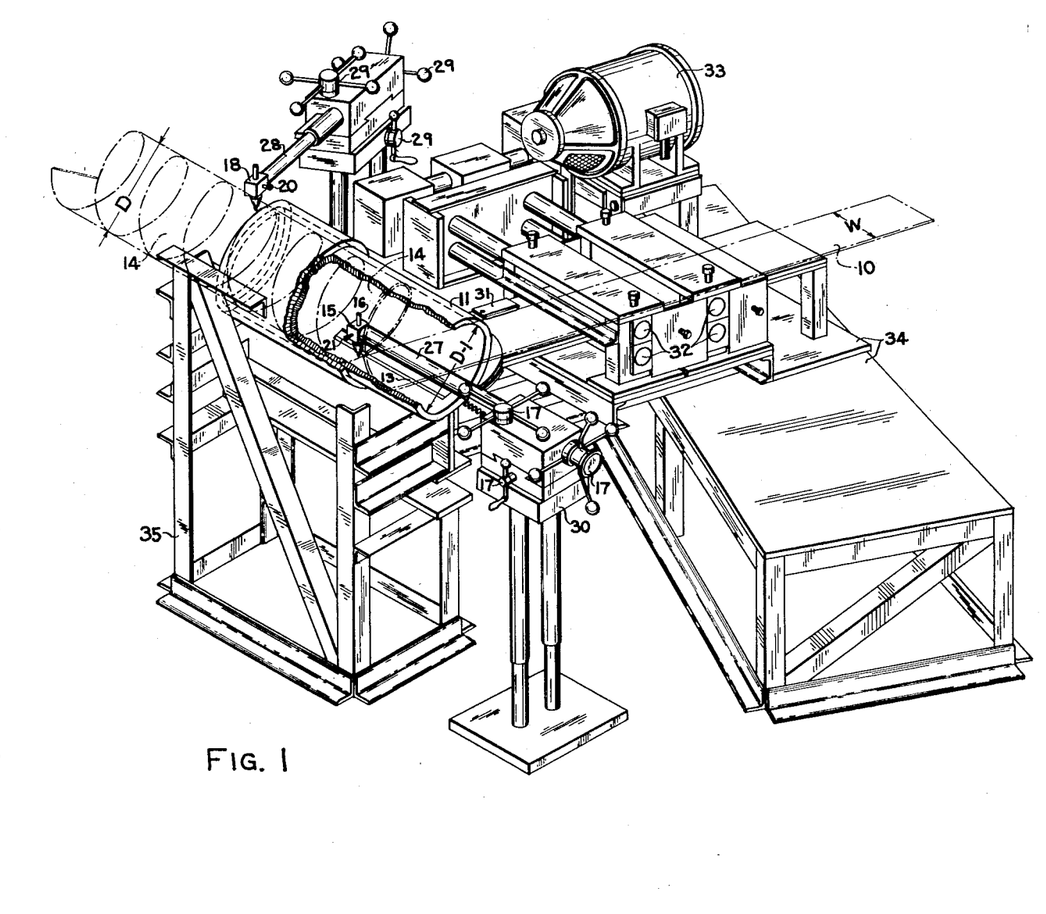
Fig. 1 is a cut-away perspective view of the novel machine embodying the present invention, including a unique, primary internal welding assembly and showing schematically the helical path of movement of a typical metal strip through the machine.
Figure 2:
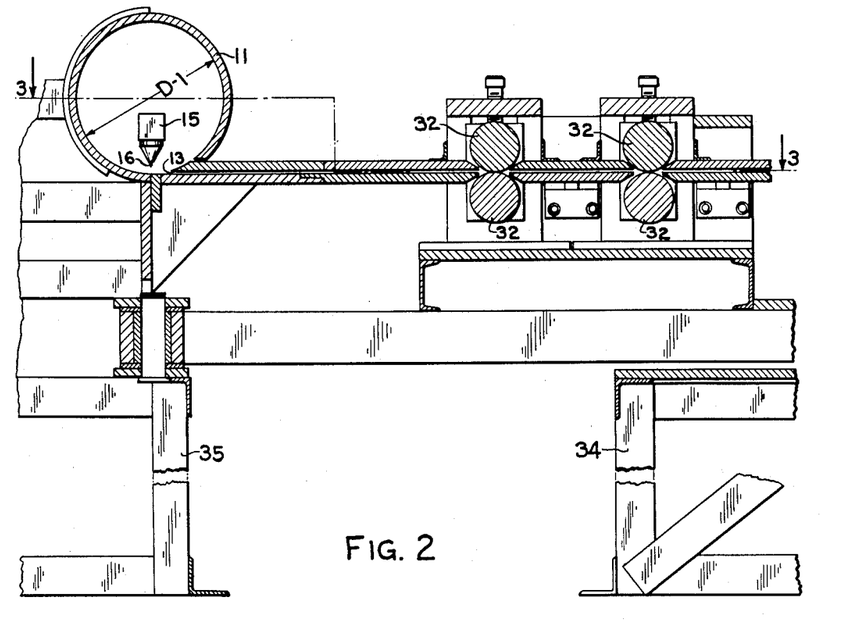
Fig. 2 depicts an elevational, cross-sectional view to illustrate the combination of structural elements comprising strip-feeding and forming-cylinder components of the unique machine provided by the present invention.
Figure 3:
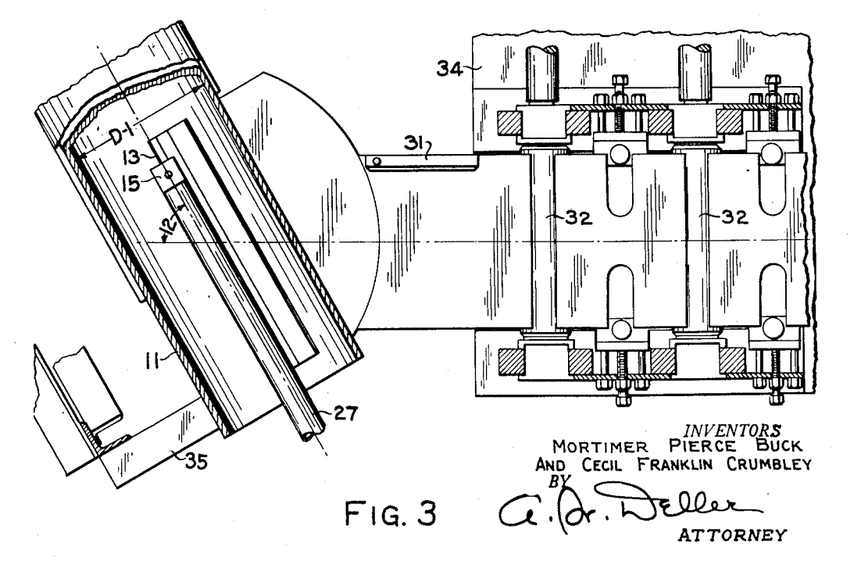
Fig. 3 shows a plan view in section taken along line 3—3 of Fig. 2.

The present invention contemplates tangentially force feeding metal strip 10 (Fig. 1), having substantially square and parallel edges, into cylinder 11 (Figs. 1, 2 and 3) at an angle 12 (Fig. 3) to the longitudinal axis thereof. The inside diameter D–1 (Figs. 1 and 2) of said cylinder is about equal to and controls the outside diameter D (Fig. 1) desired for the finished welded tube. The strip, having substantially uniform width and thickness, is force fed into the forming cylinder by means of a series of guides and driving rolls powered by motor 33 and supported by structure 34, as shown in Figs. 1, 2 and 3. A self-aligning strip guide 31 (Fig. 3), having a hardened face, is provided between the exit side of the rolls 32 (Figs. 2 and 3) and the slotted strip-entry port 13 (Fig. 2) of forming cylinder 11. This guide prevents the strip from moving laterally in the direction in which the tube is being helically formed and has a relatively long bearing surface since the force exerted against it is of high magnitude. If only a small contact area is employed, e. g., as in the case of a roller guide, the edge of the strip tends to be deformed. By making this guide self-aligning, uniform distribution of the force exerted against it is assured.

The metal strip 10, being force fed at angle 12 through slotted strip-entry port 13 near one end of said forming cylinder 11 which is supported by structure 35, tangentially engages the inside surface of said cylinder in sliding contact therewith and, upon continued forcing of the metal strip into the cylinder, said strip is thereby formed into a tubular helix 14 (Fig. 1). The slotted strip-entry port 13 is located near one end of cylinder 11, hereinafter defined as the strip-entry end of said cylinder, which is opposite the open end, hereinafter defined as the tube-discharge port of said cylinder, from which the helically-formed strip emerges. The strip-entry port 13 is substantially parallel to the longitudinal axis of said cylinder and is tangentially located with respect to the curved inner surface of said cylinder as shown in Fig. 2.

The lateral angle of entry of the strip into the forming cylinder, i. e., the angle 12 between the longitudinal axis of the strip 10 and the longitudinal axis of the forming cylinder 11, is so adjusted and controlled that the contiguous edges of the adjacent helical convolutions of the resulting tubular helix are in abutting contact. In other words, the aforesaid angle is determined by the geometry of the particular width W (Fig. 1) of initial strip employed and the particular outside diameter D (Fig. 1) of finished tubing produced therefrom. For a given width of initial strip and finished tube diameter there is only one angle of entry for producing a tube having a helical seam with abutting contiguous edges. Any variation from this one angle, for a given strip width and tube diameter, will either produce a helically-formed tube having an open seam or a tube having adjacent convolutions with overlapping or buckled edges.

Under certain circumstances in order to promote more uniform movement of the strip within the forming cylinder it is sometimes desirable to introduce a lubricant to that surface of the strip which is in rubbing contact with the inside wall of the forming cylinder. Preferably, such lubricant is applied to the aforementioned strip surface after it passes through the driving rolls but before it enters the forming cylinder through the slotted strip-entry port. Flake graphite is particularly satisfactory for this purpose.

Figures 4, 5:
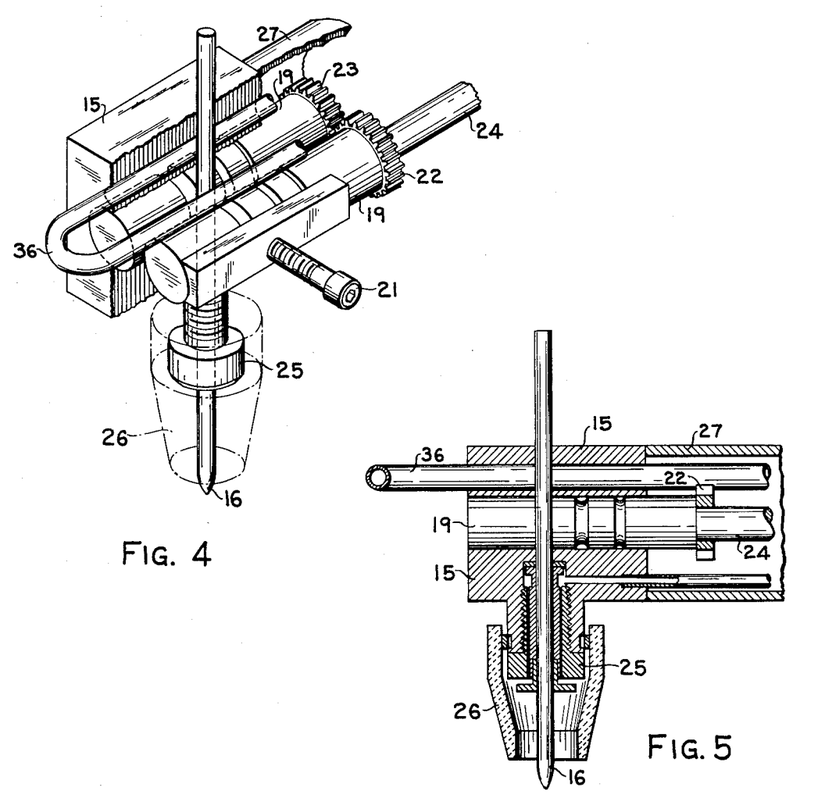
Fig. 4 is an isometric view of the novel preferred "primary" welding-head assembly and shows the method employed to adjust the length of the electrode.
Fig. 5 is a cross-sectional elevational view of the preferred "primary" welding-head assembly shown in Fig. 4, and illustrates the novel combination of structural elements in the welding-head assembly employed to adjust the electrode length and to accurately control the welding conditions.

A "primary" welding-head assembly 15 (Figs. 1 and 3), preferably of the electric-arc variety such as shown in detail in Figs. 4 and 5, is positioned within the forming cylinder 11 and the helically-formed tube 14, as shown in Fig. 1, so that the inside abutting contiguous edges of adjacent helical convolutions can be autogeneously welded to a controlled depth of weld penetration intermediate the inside and outside tube-wall surfaces as the helical joint or seam passes the welding electrode 16 (Figs. 4 and 5). The weld thus formed is known as the "primary" weld or "inside" weld. Upon continued force feeding of the strip into the cylinder, the partially-welded helical tube emerges from the open end or tube-discharge port of the forming cylinder opposite the end of the cylinder near which the slotted strip-entry port 13 is located. A "secondary" welding-head assembly 18 (Fig. 1), positioned outside the tube-discharge port of the cylinder, provides means for autogeneously butt welding the outside abutting edges of the helical seam to a controlled predetermined depth sufficient to cause the "secondary" weld to contact and slightly merge with the "primary" weld without substantially interdiffusing with or causing substantial fusion of the "primary" weld. This secondary weld, like the primary weld, can also be controlled so that it is substantially flush with the outside surface of the tube to form a smooth surface therewith as illustrated by the tube shown in Figs. 7, 8 and 9. This combination of "primary" and "secondary" butt welds produces a "composite" butt weld upon merging. Where the term "composite" weld is employed hereinafter, it is meant that both the primary and secondary weld may either be of the same composition, i. e., as in welding homogenous metal tubing by the present process, or that the primary and secondary welds may be dissimilar metals, i. e., as in welding clad-metal tubing by the present process. It is one of the novel aspects of the present invention that the variants of each welding operation are so regulated that each weld penetrates a controlled predetermined distance between the inside and outside abutting edges of the tubular helix.

Figure 10:
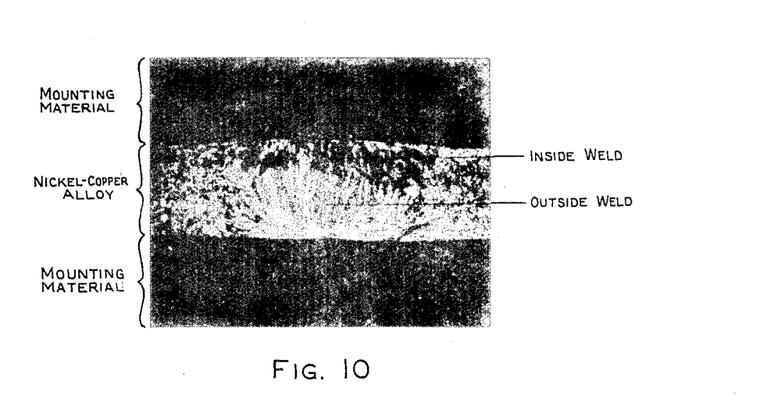
Fig. 10 illustrates a reproduction of a photomicrograph at 12 magnifications of a transverse section through a weld in a homogeneous metal tube, made of an alloy containing about 2 parts of nickel to about 1 part of copper, formed and welded according to the method of the present invention.
Figure 11:
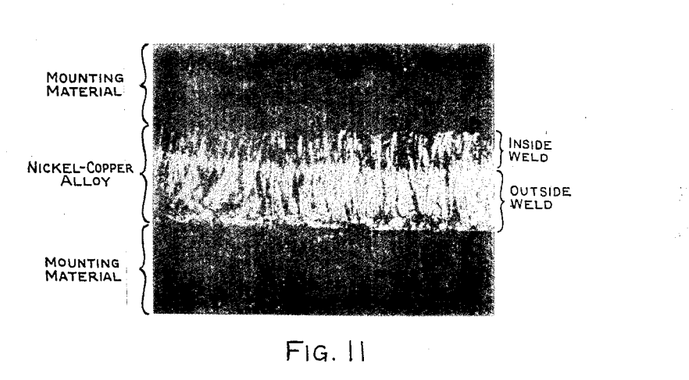
Fig. 11 illustrates a reproduction of a photomicrograph at 12 magnifications of a longitudinal section through the weld in the same metal tube shown in Fig. 10.
Figure 12:
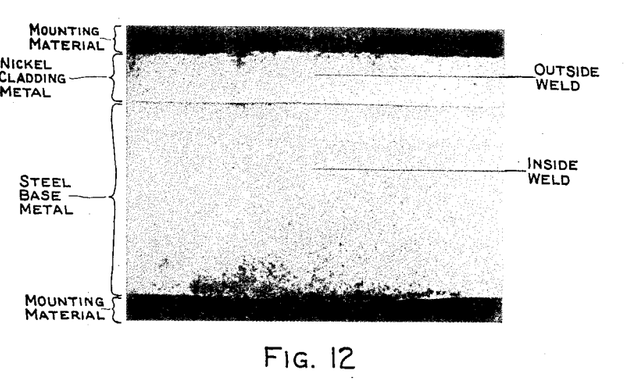
Fig. 12 is a reproduction of a photomicrograph at 11 magnifications of a transverse section through a weld in a nickel-clad steel tube formed and welded according to the method of the present invention.
Figure 13:
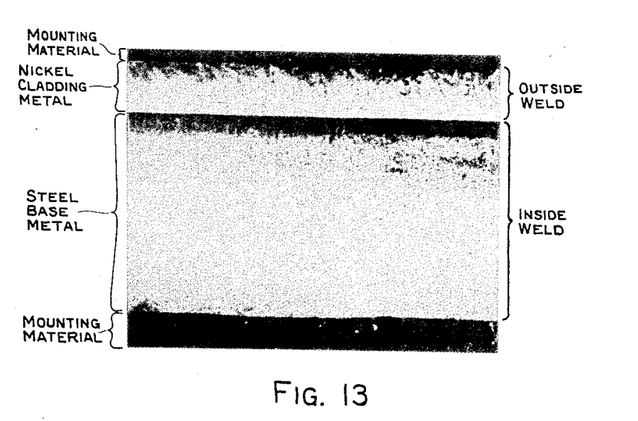
Fig. 13 is a reproduction of a photomicrograph at 11 magnifications of a longitudinal section through the weld in the same nickel-clad steel tube of Fig. 12.

The actual amount or degree of the primary weld penetration, in cases where the tube is being produced from homogeneous metal strip, i. e., in cases where the initial metal strip is a single metal not a clad metal, is critical and is controlled so that the heat of the primary weld does not penetrate to, or cause fusion of, the outside abutting edges of the seam in the metal helix. By this procedure, the primary weld can not only be maintained substantially flush with the inside tube-wall surface but also, by virtue of its partial rather than complete penetration, cannot extrude as a root bead from the outside wall surface of the tube. Upon emergence of the partially-welded helical tube from the discharge port of the forming cylinder, the unwelded outside abutting edges of the tube are then welded by the secondary welding operation, also under closely regulated conditions, to obtain the desired controlled depth of weld penetration, namely, a depth of penetration sufficient to contact the primary weld without substantial interdiffusion therewith or substantial fusion thereof. At the same time, this secondary weld can be maintained substantially flush with the outside tube-wall surface. Such a weld is shown in Figs. 10 and 11.

Where clad-metal strip is employed to produce clad-metal tubing by the present novel process, the degrees of penetration of both welds, which are of the same composition as their respective components, i. e., either cladding metal or base metal components, are very critical since it is one of the main purposes of the present invention to provide helically-formed, butt-welded, clad-metal tubing wherein the cladding metal and cladding-metal weld are maintained uncontaminated by interdiffusion with fused base metal and base-metal weld (see Figs. 12 and 13). In this case, the degree of penetration of each weld is controlled by regulating the welding variants and the rate with which the seam moves through the welding arcs or flames so that each weld penetrates only approximately to the interfacial surface between the cladding metal and the base metal. In this manner, the welding heat of each weld does not sufficiently penetrate the other component of the clad tube to cause fusion and contamination thereof. The foregoing novel essential feature of the present invention, providing close, accurate control over the degrees of weld penetration, applies equally well in the production of both externally-clad and internally-clad tubing.

For certain applications where the major requirements are that the inside surface of the tube must be smooth but that the weld as a whole must also possess high strength, e. g., catalyst tubes operating at high temperatures, the outside or secondary weld can be reinforced by the addition of a filler wire which can be added by any of the conventional methods, e. g., by an automatic feeding device wherein the filler wire is fed into the arc by an automatic mechanism. In these cases, the smoothness of the outside surface of such tubes is of minor or negligible consequence and a raised, reinforcing weld bead such as would be caused by the use of a filler rod increases the strength of the weld and does not impair the service usefulness of such tubing. For certain other applications, it may be desirable to produce tubing wherein the primary or inside weld is reinforced by a filler rod for purposes of improving the strength of the weld and wherein the secondary or outside weld is substantially flush in the as-welded condition with the outside tube surface. Such tubing can likewise be produced by the novel process of the present invention.

Since the inside welding head 15 is positioned within the forming cylinder 11 and the helically-formed tube 14, adjustments for controlling the primary welding conditions are made by remote control means 17 (Fig. 1) as described more fully hereinafter.

The forming cylinder must be sufficiently long to fully support the partially-welded helical tube until the primary weld has cooled to a temperature where the tube becomes substantially rigid. This can be satisfactorily accomplished with a cylinder length less than equivalent to two convolutions of the helix, provided the primary weld is made as soon as possible after entry of the strip into the forming cylinder, i. e., about as soon as the contiguous edges of adjacent convolutions come into abutting contact. For any particular set of fabricating conditions, including welding characteristics, tube metal composition and dimensions, there is a minimum cylinder length which will satisfactorily confine the metal tube until it becomes substantially rigid. In most but not all cases, this minimum length is equal to about 1½ convolutions although shorter lengths of forming cylinder can be employed satisfactorily.

A second welding-head assembly 18 (Fig. 1) is located outside the forming cylinder 11 and is so positioned in relation to the cylinder that the welding arc or flame impinges upon the outside edges of the helical, partially butt-welded seam of the emerging tube 14 to complete the welding from the outside edges thereof in toward the primary weld bead. As was the case with the primary weld, the welding conditions under which this secondary or outside weld is made can also be carefully controlled to produce a weld which is not only flush with the outside surface of the tube but which, in the case of a homogeneous-metal tube, penetrates into the already partially-welded joint a distance sufficient only to contact or slightly merge with the primary weld metal without, however, substantially re-melting or fusing the primary weld and without causing any fusion of the inside wall surface of the tube (see Figs. 10 and 11). In the case of clad-metal tubing the degree of penetration of the inside and outside welds is carefully controlled so that the two welds just barely merge or come into contact with one another at the interfacial surface between the cladding-metal component and the base-metal component in order to prevent contamination of the clad-metal weld by the base-metal weld (see Figs. 12 and 13). As disclosed hereinbefore, where the smoothness of either the outside or the inside wall surface of the tube, whether clad-metal or homogeneous tubing, is of no consequence but where strength of weld is of paramount importance, the outside or inside weld, respectively, can be reinforced by the addition of filler metal.

Figure 6:
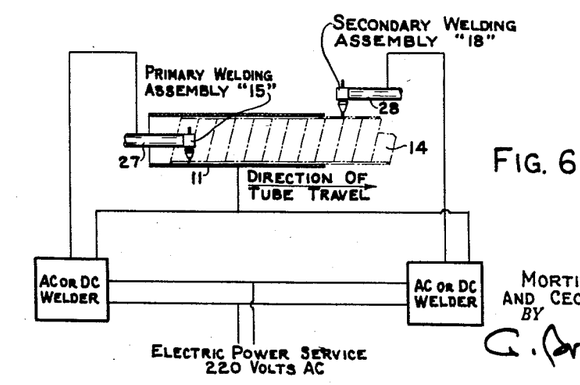
Fig. 6 is an electrical wiring diagram illustrating an embodiment of the electrical welding circuit employed in the present invention.

In carrying the invention into practice, it is preferred to employ an arc-welding technique wherein the arc is shielded by an inert gas, e. g., helium or argon, during both the primary and secondary welding operations. The power supply to the electrodes proper can be either alternating current or direct current, such as illustrated by the wiring diagram of Fig. 6. Where an autogenous weld is desired, a non-consuming electrode is used, e. g., tungsten. If a reinforced weld is desired, the electrode may either be a consuming electrode, i. e., one which melts in the arc and deposits molten metal in the weld seam, or the electrode may be a non-consuming electrode (such as the aforementioned tungsten electrode) employed in combination with a consuming filler wire which melts and deposits metal in the weld seam. Filler wire can be fed into the arc from a side of the non-consuming electrode. A novel feature of the present invention is the means provided for controlling the welding variants of the primary welding operation. Since the primary welding head assembly 15 is located within the confines of the forming cylinder 11, usually a distance of more than a foot inside the cylinder from the strip-entry end thereof, it is necessary that the various adjustments for closely controlling the welding operation be made by remote control. For instance, the feed of the tungsten electrode 16 (Figs. 4 and 5) must be controlled to compensate for electrode burn-off without breaking the arc between electrode and tube wall.

A preferred embodiment of the novel primary welding-head assembly showing the various essential structural elements thereof is illustrated in detail in Figs. 4 and 5. The primary electrode 16 is held between a pair of rolls 19 which are grooved to fit the electrode diameter. Several sets of grooves of various sizes are provided to permit the use of different size electrodes. The rolls 19 are supported within a water cooled block or housing 15 and a screw 21 is provided to apply pressure on the rolls and hold the electrode firmly. A gear 22 attached to one roll engages a similar gear 23 on the other roll causing the other roll to rotate a like amount in the opposite direction and thus move the electrode. A shaft 24 is attached to the axis of one roll and has a handle on the other end. When the electrode is in welding position within the tube-forming cylinder, this shaft extends through and beyond the strip-entry end of the cylinder and permits adjustment by remote control of the electrode to compensate for burn-off during welding. A bushing 25 having an axial hole the diameter of the electrode screws into the housing and serves as a guide to prevent lateral motion of the electrode during adjustment. Inert gas is fed through a hole in the housing into an annular groove in the end of the bushing. A series of small holes in the bushing conducts the gas from this groove and delivers it near the welding end of the electrode. The top end of the bushing compresses a wad of packing material against the electrode and prevents escape of the inert gas through the housing. The end of the electrode is surrounded by a suitable cup 26 which directs the flow of inert gas, such as helium or argon, around the arc and prevents air from being carried into the arc. The electrode is supported and held rigidly in welding position by means of an arm 27 (Fig. 1) which is attached to the housing and is long enough to extend outside the strip-entry end of the forming cylinder where it is attached to a suitable support 30 (Fig. 1), said support being provided with means 17 for adjusting the position of the electrode. The arm 27 may be in the form of a tube through which the water lines, gas line, and adjusting shaft 24 are run.

In a preferred embodiment of the present invention the secondary or outside welding assembly is structurally about the same as the primary or inside welding assembly, such as illustrated in Figs. 1, 4 and 5. The secondary welding-head assembly 18 is supported by arm 28 and is provided with adjusting means 29. The positioning of the secondary welding electrode relative to the outside of the spiral seam is adjusted and controlled in the same manner as is the primary welding electrode.

In employing the foregoing welding technique, it is preferred that the forming cylinder have a length equal to about two convolutions of the helically-formed tube when strip is being tangentially force-fed at an angle 12 thereinto. As hereinbefore stated the angle of entry of the strip into the forming cylinder, if the contiguous edges of adjacent convolutions are to come into abutting contact and not overlap, buckle or gap apart, is determined solely by the width of the entering strip and the inside diameter D-1 of the forming cylinder, said diameter controlling the outside diameter D of the finished tubing.

Figure 7:
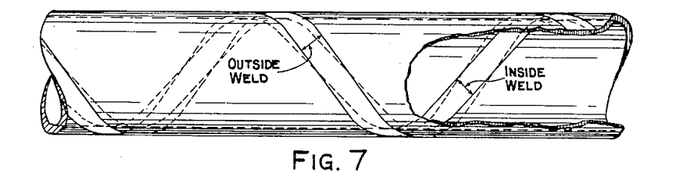
Fig. 7 is a partially cut-away schematic view of a helically-formed, butt-welded metal tube made by the present process and machine and shows the as-welded flush relationship between the helical butt weld and the adjacent parent metal of the tube.
Figure 8:
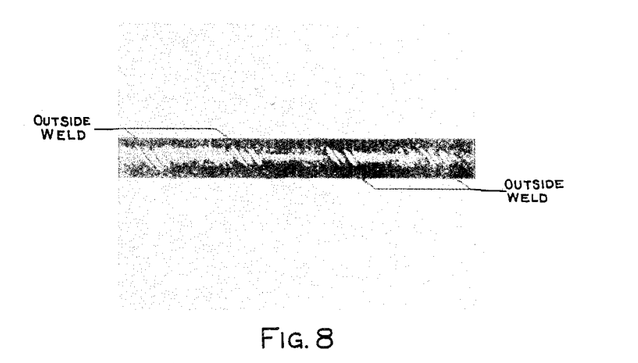
Fig. 8 is a full-size reproduction of a photograph of a helically-formed, welded metal tube, having an outside diameter of ½ inch, a wall thickness of 0.025 inch and made of a nickel-base alloy containing chromium and iron, which was manufactured according to the present novel process and which shows several helical convolutions having flush-welded abutting outside edges in the as-welded condition.
Figure 9:
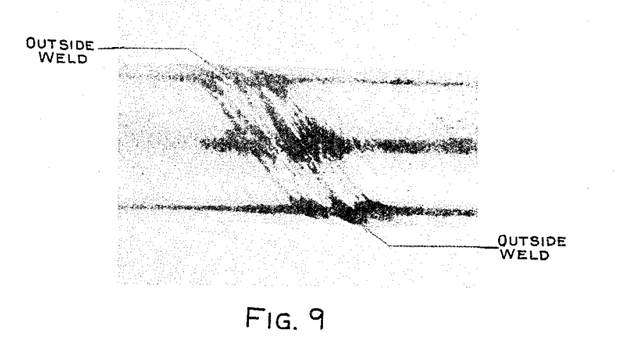
Fig. 9 is a slightly magnified reproduction of the photograph of Fig. 8 at 3½ magnifications, further illustrating the as-welded surface smoothness between the weld metal and the parent metal of the tube made by the present process.

The present invention provides a novel method and apparatus for producing butt-welded, helically-formed metal tubes from a wide variety of metals and alloys, both ferrous-base and non-ferrous base alloys, which can ordinarily be welded by conventional welding processes. Thus, the novel tubing product of the present invention, as illustrated in Figs. 7, 8 and 9, can be made from iron and its alloys, copper and copper alloys, nickel and nickel alloys, etc. The present process and apparatus are particularly adaptable to manufacturing helically-formed, butt-welded tubing, having a butt-weld substantially flush with a surface of the tubing in the as-welded condition, made of metal from the group consisting of nickel, nickel-base alloys containing copper, nickel-base alloys containing chromium, stainless steels, copper and copper-base alloys containing nickel.

For the purpose of giving those skilled in the art a better understanding of the invention and a better appreciation of the advantages of the invention the following examples and the data given in the following table are illustrative of the wide variety of tubes, both homogeneous and clad-metal tubes, which can be produced by the present novel process. Figs. 10 and 11 are photomicrographic reproductions at 12 diameters of a transverse and a longitudinal section, respectively, through the weld in a tube produced by the method of the present invention and made of a nickel-copper alloy sold under the trademark "Monel." Figs. 10 and 11 would correspond to sections taken through the weld seam at the bottom of the tubes shown in Figs. 7, 8 and 9. This tube was produced under the following conditions:

| | |
|---|---|
| Strip thickness | 0.250 inch. |
| Welding speed | 9.5 inches per minute. |
| Primary welding current | 235 amperes direct current. |
| Secondary welding current | 235 amperes direct current. |
| Welding voltage | 20 volts. |
| Inert gas shield | 99.8% pure helium. |

Furthermore, various types of clad-metal tubing, such as steel tubes clad with the aforesaid nickel-copper alloy, nickel-clad steel tubes, steel tubes clad with a nickel-chromium-iron alloy such as sold under the trademark "Inconel," nickel tubes clad with the aforesaid nickel-copper alloy or with the aforesaid nickel-chromium-iron alloy, and the said nickel-copper alloy clad with the said nickel-chromium-iron alloy, can also be produced by the present novel process, as well as other combinations of clad tubing. Figs. 12 and 13 are photomicrographic reproductions at 11 diameters of a transverse and a longitudinal section, respectively, through the weld in a nickel-clad steel tube produced by the method of the present invention. Figs. 12 and 13 would correspond to sections taken through the weld seam at the top of a horizontal nickel-clad steel tube. The half-moon area seen in Fig. 12 at the top of the steel primary weld and directly below the secondary nickel weld is a heat-affected zone in the steel-base primary weld resulting from heat treatment by the secondary nickel-cladding weld. The steel in this area has been raised above its transformation temperature and then rapidly cooled by the relatively large mass of the surrounding metal. A similar zone could not appear in the nickel-cladding metal since nickel does not undergo a similar allotropic transformation. This heat-affected zone appears in Fig. 13 as a darkened area extending horizontally across the figure immediately below the nickel-cladding secondary weld. The tube was produced under the following conditions:

| | |
|---|---|
| Total thickness of clad material | 0.250 inch. |
| Thickness of nickel cladding | 0.050 inch. |
| Thickness of steel base material | 0.200 inch. |
| Welding speed | 18 inches per minute. |
| Primary welding current | 160 amperes direct current. |
| Secondary welding current | 320 amperes direct current. |
| Welding voltage | 20 volts. |
| Inert gas shield | 99.8% pure helium. |

The data contained in the following table are presented as illustrative of tubes, either clad-metal or homogeneous-metal tubes, produced by the present novel process.

| Ex. No. | Strip width, inches | Tube wall thickness and strip thickness, inches | Tube, O. D., and Forming Cyl., I. D., inches | Strip entry angle [1] | Forming Cyl. length, inches |
| --- | --- | --- | --- | --- | --- |
| 1 | 9 | 0.032 | 3 | 17°15′ | 76 |
| 2 | 6 | 0.032 | 3 | 50°30′ | 20 |
| 3 | 12 | 0.042 | 6 | 50°30′ | 40 |
| 4 | 12 | 0.134 | 6 | 50°30′ | 40 |
| 5 | 12 | 0.259 | 6 | 50°30′ | 40 |
| 6 | 12 | 0.180 | 18 | 77°45′ | 31 |

I. D.—inches = inside diameter measured in inches.
O. D.—inches = outside diameter measured in inches.
[1] Strip entry angle measured in degrees and minutes.

The present invention is particularly applicable to the production of helical, butt-welded tubing of a wide range of wall thicknesses and diameters. In particular, the present process and apparatus are adaptable to directly producing tubes of larger diameters than can be commercially produced by other methods, e. g., by extrusion, piercing, drawing, etc. Insofar as the minimum diameter of tubing which can be directly produced according to the present invention is concerned, the minimum diameter is limited only by practical engineering considerations. The size of inside diameter of tubing which can be commercially or practically produced by employing the particular embodiment of primary welding-head assembly illustrated in Figs. 4 and 5 is about 4 inches. To produce tubes having inside diameters as small as ⅜ inch, only the electrode itself is introduced through the open end of the forming cylinder, the electrode supports and controls being located outside the forming cylinder. In the latter case, the electrode can be surrounded by a jacket for conducting inert gas to the vicinity of the arc or, in the case of very small diameter tubes, the entire bore of the tube can be filled with inert gas to blanket the arc. Where the tubes are to be exposed to highly corrosive fluids at various temperatures, then it is essential that the continuity of the tube wall surfaces exposed to said fluids be as smooth as possible for the reasons given hereinbefore. Thus, tubes for conveying corrosive liquors or gases, e. g., tubes for handling paper-mill liquors, pulp, etc., must be made of corrosion-resistant metal and possess a smooth bore free from crevices, ridges or weld-bead extrusions which would accelerate corrosion. Tubing for sanitary applications, e. g., food handling, cooking, etc., must likewise be free from surface discontinuities which would harbor bacteria, etc. Another application for tubing made by the present novel process is tubing which could be used as rollers, such as rolls to carry Fourdrinier screen in the paper making industry. Tubes made by the present process from oxidation-resistant metal are particularly useful at elevated temperatures, such as flame tubes in radiant-heat furnaces, high-temperature metal tubes, furnace muffles, etc. In many of the high-temperature applications in particular, tubing lengths and diameters are generally required which exceed the lengths and diameters commercially obtainable by conventional seamless-tube producing processes.

The present invention also provides a method for manufacturing helical, butt-welded tubing wherein the helical weld is substantially flush with one or both of the tube wall surfaces without any root bead extrusions, ridges or lap crevices in said surface or surfaces in the as-welded condition. This desirable feature is not obtained in welded tubing produced by conventional methods. Furthermore, helical, butt-welded, clad-metal tubing is produced by the present method wherein the cladding metal is substantially uncontaminated in the weld zone by diffusion thereinto of base metal or base-metal weld.

It is to be observed that the present invention provides as a novel product, helical, butt-welded tubing, including clad tubing, comprising a plurality of convolutions wherein adjacent convolutions have contiguous abutting edges united by a continuous composite butt-weld permanently and rigidly uniting said edges and being substantially flush with at least one of the tube-wall surfaces. Furthermore, the invention provides a unique apparatus for carrying the foregoing novel process into practice to produce the novel product of the present invention.

It is to be noted that the present invention is not to be confused with prior art methods for producing helical butt-welded tubing wherein the welding is accomplished as a single operation which, if full weld penetration is to be assured, produces extruded root beads in the case of butt-welds or crevices in the weld zone in the case of lap-welds.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A welded metal tube comprising a helically-formed metal strip of substantially uniform width and thickness, having substantially square and parallel edges and having abutting contiguous edges of adjacent convolutions of said helically-formed metal strip permanently and rigidly united by a continuous, composite, autogenous, inert gas-shielded, electric-arc butt weld having an exposed surface substantially flush with a surface of said tube in the as-welded condition; said composite weld being composed of a primary, continuous, autogenous, inert gas-shielded, electric-arc, butt weld penetrating from the inside tube-wall surface toward the outside tube-wall surface and a secondary, continuous, autogenous, inert gas-shielded, electric-arc butt weld penetrating from the outside tube-wall surface toward the inside tube-wall surface and contacting but not substantially interdiffusing with said primary weld between the tube-wall surfaces of said tube to form said composite weld.

2. The welded metal tube set forth in claim 1 in which the exposed surface of the composite, autogenous butt weld, opposite to the said substantially-flush exposed surface set forth in claim 1, is reinforced by filler metal fused and solidified thereon.

3. The welded metal tube set forth in claim 1 made of metal from the group consisting of nickel, nickel-base alloys containing copper, nickel-base alloys containing chromium, stainless steels, copper and copper-base alloys containing nickel.

4. A welded clad-metal tube comprising a helically-formed clad-metal strip of substantially uniform width and thickness, having substantially square and parallel edges and having abutting contiguous edges of adjacent convolutions of said helically-formed clad-metal strip permanently and rigidly united by a continuous, composite, autogenous, inert gas-shielded, electric-arc, clad-metal butt weld having an exposed surface substantially flush with a surface of said clad-metal tube in the as-welded condition; said composite clad-metal weld being composed of a primary, continuous, autogenous, inert gas-shielded, electric-arc butt weld penetrating from the inside tube-wall surface to about the interface between the metal components of said clad-metal tube and having substantially the same composition as the inside surface layer of said tube, and a secondary, continuous, autogenous, inert gas-shielded, electric-arc butt weld penetrating from the outside tube-wall surface to about said interface and having substantially the same composition as the outside surface layer of said clad-metal tube, said primary weld and said secondary weld being in contact but not substantially interdiffused with each other at said interface between the tube-wall surfaces of said clad-metal tube to form said composite weld.

5. The welded, clad-metal tube set forth in claim 4 in which the exposed surface of the composite, autogenous, clad-metal butt weld, opposite to the said substantially-flush exposed surface set forth in claim 4, is reinforced by filler metal fused and solidified thereon.

6. The welded, clad-metal tube set forth in claim 4 in which at least one of the metal components of said clad-metal tube is made of metal from the group consisting of nickel, nickel-base alloys containing copper, nickel-base alloys containing chromium, stainless steels, copper and copper-base alloys containing nickel.

7. A method for producing a welded, helically-formed metal tube having a continuous helical, composite, autogenous, inert gas-shielded, electric-arc, butt-welded seam substantially flush with a surface of said tube in the as-welded condition which comprises substantially tangentially force feeding metal strip of substantially uniform width and thickness and having substantially square and parallel edges through a slotted strip-entry port in a cylinder having an open end, said strip-entry port being substantially tangential to the curved inner surface of said cylinder; continuing force feeding said metal strip through said strip-entry port into said cylinder at an angle to the longitudinal axis of said cylinder to form in said cylinder a helically-formed metal tube having a plurality of convolutions, adjacent convolutions having contiguous edges in abutting contact; continuously, autogenously, inert gas-shielded, electric-arc, butt welding said edges from the inside of said tube to produce a continuous, autogenous, inert gas-shielded, electric-arc, primary butt weld having a depth of penetration intermediate the inside and outside tube-wall surfaces while said tube is still within said cylinder; continuing force feeding said strip into said cylinder to cause the partially-welded tube to emerge from an open end of said cylinder; continuously, autogenously, inert gas-shielded, electric-arc, butt welding said edges from the outside of the emerged tube to produce a continuous, autogenous, inert gas-shielded, electric-arc, secondary butt weld having a depth of penetration intermediate the outside and inside tube-wall surfaces, said secondary weld contacting but not substantially interdiffusing with said primary weld to produce a continuous, composite, autogenous, inert gas-shielded, electric-arc butt weld; thereby producing a helically-formed, autogenous, inert gas-shielded, electric-arc, butt-welded metal tube having a surface in substantially flush relationship with an exposed surface of said composite butt weld in the as-welded condition.

8. The method set forth in claim 7 in which the exposed surface of the composite, autogenous, butt weld, opposite to the said substantially-flush exposed surface set forth in claim 7, is reinforced by fusing and solidifying filler metal thereon.

9. The method set forth in claim 7 in which the metal strip is made of metal from the group consisting of nickel, nickel-base alloys containing copper, nickel-base alloys containing chromium, stainless steels, copper and copper-base alloys containing nickel.

10. A method for producing a welded, helically-formed clad-metal tube having a continuous helical, autogenous, inert gas-shielded, electric-arc, butt-welded clad-metal seam substantially flush with a surface of said tube in the as-welded condition which comprises substantially tangentially force feeding clad-metal strip of substantially uniform width and thickness and having substantially square and parallel edges through a slotted strip-entry port located in a cylinder having an open end, said strip-entry port being substantially tangential to the curved inner surface of said cylinder; continuing force feeding said clad-metal strip through said strip-entry port into said cylinder at an angle to the longitudinal axis of said cylinder to form in said cylinder a helically-formed clad-metal tube having a clad-metal component and a base-metal component and having a plurality of continuous convolutions, adjacent convolutions having contiguous edges in abutting contact; continuously, autogenously, inert gas-shielded, electric-arc, butt welding said edges from the inside of said tube to produce a continuous, autogenous, inert gas-shielded, electric-arc, primary butt weld having a depth of penetration extending to about the interfacial surface between the metal components of said clad-metal tube while said tube is still within said cylinder; continuing force feeding said clad-metal strip into said cylinder to cause the partially-welded, clad-metal tube to emerge from an open end of said cylinder; continuously, autogenously, inert gas-shielded, electric-arc, butt welding said edges from the outside of the emerged tube to produce a continuous, autogenous, inert gas-shielded, electric-arc, secondary butt weld having a depth of penetration extending to about the interfacial surface between the metal components of said tube, said secondary weld contacting but not substantially interdiffusing with said primary weld to produce a continuous, composite, autogenous, inert gas-shielded, electric-arc, clad-metal butt weld; thereby producing a helically-formed, autogenous, inert gas-shielded, electric arc, butt-welded, clad-metal tube wherein the metal components of said clad-metal tube are substantially uncontaminated by each other and wherein a surface of said tube is in substantially flush relationship with an exposed surface of said composite, clad-metal butt weld in the as-welded condition.

11. The method set forth in claim 10 in which the exposed surface of the composite, autogenous, clad-metal butt weld, opposite to the said substantially-flush exposed surface set forth in claim 10, is reinforced by fusing and solidifying filler metal thereon.

12. The method set forth in claim 10 in which at least one of the components of the clad-metal strip is made of metal from the group consisting of nickel, nickel-base alloys containing copper, nickel-base alloys containing chromium, stainless steels, copper and copper-base alloys containing nickel.

13. In the art of making spiral pipe by winding a strip of metal stock helically into tubular form with its opposite edge portions meeting in a helical seam, the method of continuously welding said seam, as it advances helically from the forming process, which consists in continuously carrying on two spatially separate welding operations on said seam, one of said welding operations being performed downwardly inside the pipe as the advancing seam crosses the bottom region of said pipe and the other welding operation being performed downwardly outside the pipe as the advancing seam crosses the top region thereof, said two welding operations welding the seam successively on the two sides of the stock.

14. A welded clad-metal tube comprising a helically-formed clad-metal strip having the abutting contiguous edges of said helically-formed clad-metal strip united by a continuous butt weld penetrating from the inside tube-wall surface to about the interface between the metal components of said clad-metal tube and a continuous butt weld penetrating from the outside tube-wall surface to about said interface, said continuous butt welds being not substantially interdiffused with each other at said interface between the metal components of said clad-metal tube whereby the metal components of said clad-metal tube are substantially uncontaminated by each other.

15. In the art of making a tube by winding a strip of metal stock helically into tubular form with its contiguous edges meeting in a helical seam, the method of continuously welding said seam which consists in continuously applying a first welding heat to the moving seam to melt and fuse the meeting edges to a depth less than the thickness of the stock, and continuously applying a second welding heat to the unfused portion of said seam to weld said unfused portion, one of said welding operations being carried on from outside the tube, and the other from inside the tube, and said second welding operation being conducted at a position approximately diametrically opposite to the first welding operation.

16. A method of producing a welded, helically-formed, clad-metal tube which comprises forming clad metal strip into a metal tube having a plurality of convolutions with the adjacent edges of the convolutions in abutting contact to form a helical seam, continuously forming a primary weld from one side of said helical seam while supporting the contiguous edges of said seam in abutting contact at the welding region, said primary butt weld having a depth of penetration intermediate the inside and outside tube-wall surfaces, and continuously forming a secondary butt weld from the opposite side of said tube, said secondary butt weld penetrating intermediate the inside and outside tube-wall surfaces, and controlling the welding conditions so that the two welds have a depth of penetration extending to about the interfacial surface between the metal components of the clad-metal tube, said continuous butt welds not substantially interdiffusing with each other at said interface between the metal components of said clad-metal tube whereby the metal components of said clad-metal tube are substantially uncontaminated by each other.

17. A welded metal tube comprising a helically-formed metal strip having the abutting contiguous edges of said helically-formed metal strip united by a continuous butt weld penetrating from the inside tube-wall surface and having a depth of penetration intermediate the inside and outside tube-wall surfaces and a continuous butt weld penetrating from the outside tube-wall surface and having a depth of penetration intermediate the inside and outside tube-wall surfaces, said continuous butt welds contacting but not substantially interdiffused with each other between the tube-wall surfaces of said tube.

18. In the art of making spiral pipe by winding a strip of metal stock helically into tubular form with its opposite edge portions meeting in a helical seam, the method of continuously welding said seam which consists in continuously carrying on two welding operations separated spatially along said seam with the contiguous edges of said seam supported in abutting contact at the welding region of the first of said welding operations, one of said welding operations being performed inside the pipe and the other welding operation being performed outside the pipe, said two welding operations welding the seam successively on the two sides of the stock.

References Cited in the file of this patent

UNITED STATES PATENTS

| | | |
|---|---|---|
| 473,943 | Meneely | May 3, 1892 |
| 1,248,831 | Dunham | Dec. 4, 1917 |
| 1,523,927 | Beebe | Jan. 20, 1925 |
| 1,655,930 | Woolard | Jan. 10, 1928 |
| 1,655,931 | Langstroth | Jan. 10, 1928 |
| 1,788,220 | Williams | Jan. 6, 1931 |
| 1,793,280 | Williams | Feb. 17, 1931 |
| 1,793,281 | Freeze | Feb. 17, 1931 |
| 1,793,282 | Freeze | Feb. 17, 1931 |
| 1,795,380 | Stresau | Mar. 10, 1931 |
| 1,812,123 | Stresau | June 30, 1931 |
| 1,832,059 | Stresau | Nov. 17, 1931 |
| 1,915,029 | Naylor | June 20, 1933 |
| 1,934,065 | Hermanson | Nov. 7, 1933 |
| 1,959,791 | Kautz | May 22, 1934 |
| 1,967,728 | Taylor | July 24, 1934 |
| 1,979,264 | Hodge et al. | Nov. 6, 1934 |
| 2,153,977 | Wilkins | Apr. 11, 1939 |
| 2,316,349 | McMinn | Apr. 13, 1943 |
| 2,360,160 | Pickhaver | Oct. 10, 1944 |
| 2,510,180 | Jones | June 6, 1950 |
| 2,555,256 | Tyson | May 29, 1951 |

FOREIGN PATENTS

| 482,710 | Great Britain | Mar. 30, 1938 |
|---|---|---|